United States Patent [19]
Armstrong, III

[11] Patent Number: 5,671,426
[45] Date of Patent: Sep. 23, 1997

[54] METHOD FOR ORGANIZING INCREMENTAL SEARCH DICTIONARY

[75] Inventor: John Armstrong, III, Cambridge, Mass.

[73] Assignee: Kurzweil Applied Intelligence, Inc., Waltham, Mass.

[21] Appl. No.: 80,940

[22] Filed: Jun. 22, 1993

[51] Int. Cl.⁶ .................................................. G06F 17/27
[52] U.S. Cl. ......................... 395/760; 395/254; 395/255; 395/795
[58] Field of Search ....................... 364/419.04, 419.05, 364/419.11, 419.19, 419.07, 419.12, 419.01; 395/751, 754, 755, 760, 795

[56] References Cited

U.S. PATENT DOCUMENTS

| | | |
|---|---|---|
| 4,467,446 | 8/1984 | Sakurai . |
| 4,503,514 | 3/1985 | Urquhart . |
| 4,724,523 | 2/1988 | Kucera . |
| 4,771,401 | 9/1988 | Kaufman et al. . |
| 4,775,956 | 10/1988 | Kaji et al. . |
| 4,783,803 | 11/1988 | Baker et al. . |
| 4,807,181 | 2/1989 | Duncan, IV et al. . |
| 4,882,703 | 11/1989 | Nicolai . |
| 4,994,966 | 2/1991 | Hutchins . |
| 5,027,406 | 6/1991 | Roberts et al. . |
| 5,055,049 | 10/1991 | Kasravi . |
| 5,062,074 | 10/1991 | Kleinberger . |
| 5,161,245 | 11/1992 | Fenwick . |
| 5,204,960 | 4/1993 | Smith et al. . |
| 5,229,936 | 7/1993 | Decker et al. . |
| 5,241,674 | 8/1993 | Kuersawa et al. . |
| 5,297,038 | 3/1994 | Saito . |
| 5,323,316 | 6/1994 | Kadashevich et al. . |

OTHER PUBLICATIONS

*Mindreader—Artificial Intelligence For Business Writing—*Businessoft, Inc.

Primary Examiner—Gail O. Hayes
Assistant Examiner—William N. Hughet
Attorney, Agent, or Firm—Henry D. Pahl, Jr.

[57] ABSTRACT

The electronic dictionary disclosed herein is organized for expeditious search based on partial spelling by assigning words to blocks having a predetermined maximum size, the blocks being represented by respective partial spelling sequences. The words are assigned to blocks by progressing through successive possible sequences in order and, for each sequence, determining the number of words in the set of words corresponding to that sequence. If the number of words is less than the maximum, all of the words in the set are assigned to a corresponding terminal block. Otherwise words up to a preselected number are assigned to a non-terminal block and the partial spelling sequence is extended. As a result of the organization only one call to the dictionary needs to be made for each extension of the sequence.

8 Claims, 3 Drawing Sheets

METHOD FOR ORGANIZING INCREMENTAL SEARCH DICTIONARY

MICROFICHE APPENDIX

The disclosure in this case includes a microfiche computer program listing comprising ... microfiche and ... frames. The listing is being initially submitted in printed form.

BACKGROUND OF THE INVENTION

The present invention relates to an electronic dictionary and, more particularly, to such a dictionary which is organized for expeditious search based on partial spelling.

Incremental search techniques have previously been proposed for various purposes, particularly for completion of commands in various computer applications. For example, in the well known EMACS editor, entry of a partial spelling will bring up a list of commands for that partial spelling. Likewise, partial spellings are used to obtain listings of the possible words in an editing tool which has been sold under the name Mindreader. In general, the purpose of such incremental search or spelling completion facilities is to save the user from having to type in the complete word.

Spelling completion is also widely used in speech input systems where user keyboard input may be necessary to augment speech recognition techniques. As is understood, speech recognition is being increasingly used for data and text input where it is inconvenient or difficult for the user to type in the input. Since such applications are often predicated on the avoidance of extensive typing, spelling completion is highly desirable when keyboard entry is unavoidable. One particular point where spelling completion is highly useful is in the entering of new words which are to be trained for subsequent use by speech recognition.

While these previously known products used various incremental search or spelling completion techniques, it is believed that the number of words which could be entered in this fashion was relatively limited so that the word completion dictionary could reside in local memory, i.e., the random access memory (RAM) which is directly addressable by the computer processor.

Currently, however, speech recognition products are being developed which provide large working vocabularies, i.e., twenty thousand words and more, and are useful for quite complex reporting tasks, e.g., medical reporting. However, even if a relatively large standard vocabulary is provided initially it may be necessary to add further words to the working vocabulary and these words may be lengthy and/or complex. To assure that the new word is correctly spelled and properly entered, it is appropriate to make available to the user a quite complete dictionary, e.g., one comprising two hundred thousand words or more. However, it is not appropriate to store such a large dictionary in the local memory of the computer since that memory is heavily used by the speech recognition task itself. Accordingly, such dictionaries must typically be held in a rotating magnetic memory, e.g., a Winchester type hard or fixed disk. As is understood, access to a disk, even a relatively fast hard disk, is slow as compared with access to local RAM memory. It is therefore advantageous to reduce the number of calls or accesses which are made to the hard disk for any given purpose.

Among the several objects of the present invention may be noted the provision of a electronic dictionary which is organized for expeditious search; the provision of such a dictionary where a search may be based on partial spelling; the provision of such a dictionary in which words corresponding to a given partial spelling sequence prefix are presented in order of likelihood of occurrence; the provision of such electronic dictionary which may be conveniently stored on a rotating magnetic memory; the provision of such a dictionary which requires only a single call to provide the words associated with a given sequence; the provision of such a dictionary which the organization is easily and methodically implemented; the provision of such a dictionary which is highly reliable and which is of relatively simple and inexpensive construction. Other objects and features will be in part apparent and in part pointed out hereinafter.

SUMMARY OF THE INVENTION

In accordance with the present invention, an electronic dictionary is organized for expeditious search based on partial spelling, by assigning words in the dictionary to blocks having a predetermined maximum size and being represented by respective partial spelling sequences or prefixes. The assignment of words to blocks is made by progressing through successive possible sequences in order and, for each such sequence, determining the number of words in the set of words corresponding to that sequence. If the number of words in the parent set is less than the maximum size, all of the words in the set are assigned to a corresponding terminal block. Otherwise words in the set up to a preselected number are assigned to a corresponding non-terminal block and the partial spelling sequence is extended. Preferably, a likelihood of occurrence value is associated with each word in the dictionary and the most likely to occur words are assigned to each non-terminal block. Preferably, within each block the words are ordered in accordance with their likelihood of occurrence values.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
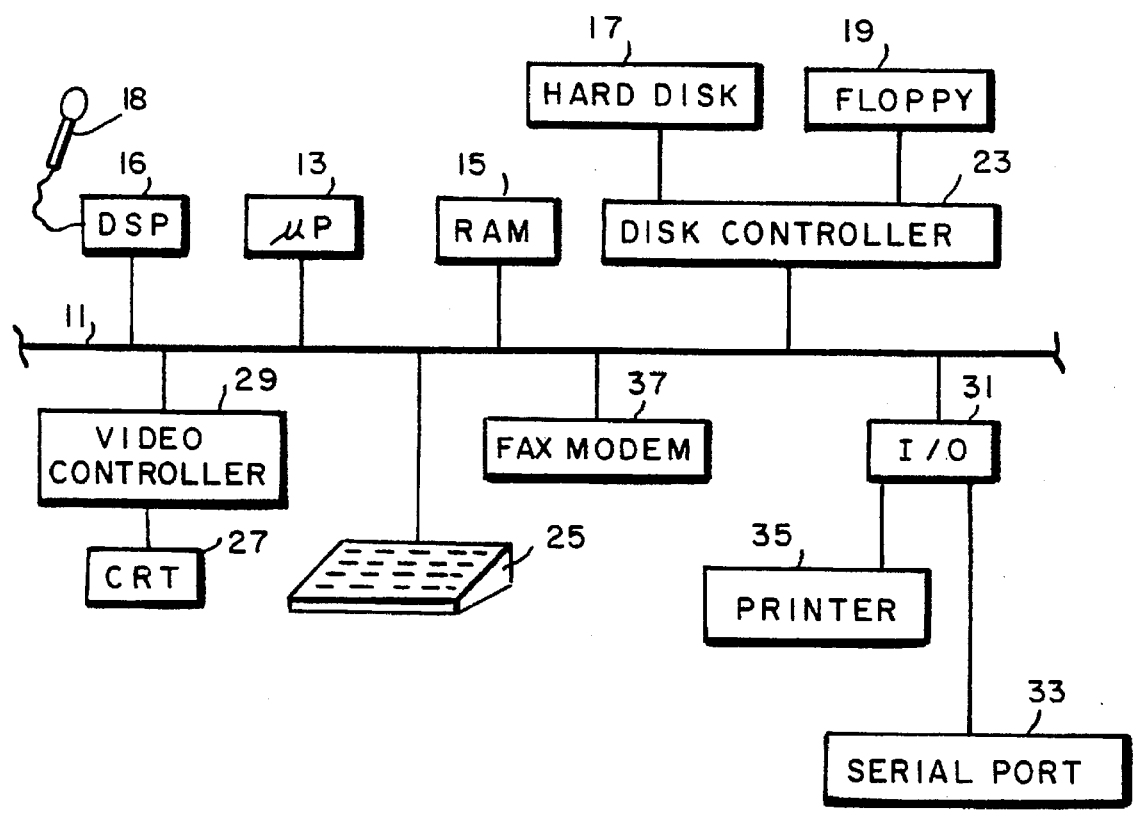
FIG. 1 is a block diagram of a computer system provided with speech recognition capability and incorporating an electronic dictionary organized in accordance with the present invention.

Referring now to FIG. 1, the computer system illustrated there is of the type generally referred to as a personal computer. The computer runs under the MS DOS operating system and is organized around a system bus, designated generally by reference character 11. The system bus may be of the so called EISA type (Extended Industry Standards Association). The computer system utilizes a microprocessor, designated by reference character 13, which may, for example, be an Intel 486 type processor. The system is also provided with an appropriate amount of local or random access memory, e.g., 8 megabytes, designated by reference character 15. Additional storage capacity is provided by a hard disk 17 and floppy diskette drive 19 which operate in conjunction with a controller 23 which couples them to the system bus.

User input to the computer system is conventionally provided by means of keyboard 25 and feedback to the user is provided by means of a CRT or other video display 27 operating from the bus through a video controller 29. External communications may be provided through an I/O system designated by reference character 31 which supports a serial port 33 and a printer 35. Advantageously, a fax modem may be provided as indicated by reference character 37. This is particularly useful for forwarding structured medical reports as described in co-assigned U.S. Pat. No. 5,168,548.

To facilitate the use of the computer system for speech recognition, a digital signal processor is provided as indicated by reference character 16, typically this processor being configured as an add-in circuit card coupled to the system bus 11. As is understood by those skilled in the art, the digital signal processor takes in analog signals from a microphone, designated by reference character 18, converts those signals to digital form and processes them e.g., by performing a Fast Fourier Transform (FFT), to obtain a series of spectral frames which digitally characterize the speech input at successive points in time.

As is understood, dictionaries are available for various fields or technologies, e.g., medical dictionaries. Further, such dictionaries are often available in electronic form and may include information regarding the frequency of use of each word. As is understood, such dictionaries are typically organized as a single file of successive words, the words being ordered alphabetically. As indicated previously, it is not practical to keep a file of dictionary size in the active local memory (RAM) of the computer but, rather, such a quantity of information will be maintained on a rotating magnetic memory such as a Winchester hard disk. However, if incremental searching is applied to such a file located on a hard disk, repeated accesses may be required in order to find an appropriate set of words. While the application of searching algorithms by the processor 13 to a block of information read from the hard disk may proceed very quickly, the need for repeated disk accesses may substantially dwarf that processing time. Accordingly, as indicated previously, an object of the present invention is to organize the dictionary in such a way that only one access or call will be needed for each partial spelling sequence or prefix entered by the user. In this context, it is considered that a new sequence has been generated each time a user enters an additional letter extending a previous sequence. As used herein, the term "prefix" should be considered to be equivalent to "partial spelling sequence" though that is a somewhat non-standard interpretation of the term "prefix".

The implementation of the dictionary as described herein is intended to place minimal constraints on the application system which utilizes the dictionary. It is assumed only that the application program will provide the target prefix, i.e. a string of characters, and a value indicating the size or number of words in the word list to be returned by the dictionary facility. The dictionary itself is organized into blocks of data and each call to the dictionary facility causes, at most, a single block to be read out from the hard disk. The blocks are constrained to a maximum size which is a design parameter selected at the time the dictionary is organized. As is understood in the art, it may be appropriate to apply certain adjustment rules to prefixes provided by an application program or user so that redundancies and ambiguities are avoided. For example, capitalization and punctuation marks may be ignored. Thus, several words or spellings may collapse to the same spelling for the purpose of matching. This application of such rules is frequently termed orthography merging check.

Since a given prefix, particularly a short one, may identify a set of words which is larger than the maximum block size, the invention provides for two types of blocks which are conveniently designated terminal or non-terminal. Non-terminal blocks are not complete in the sense that they do not contain all the words that correspond to the corresponding prefix. Further, each word in a non-terminal block will also appear in a terminal block. While this aspect of the invention means that the original dictionary file will be somewhat larger than a file merely containing an ordered list of the words in the dictionary, it is an important aspect in enabling the one access per call feature which is an important feature of the invention.

Once a terminal block has been reached, successive lists corresponding to successively extended prefixes are obtained by simply scanning the terminal block from top down for words corresponding to the current prefix until a list of the appropriate size is obtained.

Within each block, the words are preferably arranged in order of frequency of use or likelihood of occurrence so that the top of each list contains the most likely to occur words irrespective of their alphabetical order beyond the common prefix. Accordingly, once a block has been read, a list of preselected size can be obtained by merely taking that number of words from the top of the list and the resultant sublist will contain the most frequently occurring words from the block and they will be in the appropriate order. Although some words in a block read in may not then be seen by the user, he does not lose the ability to access those words since they will also appear in a terminal block (and perhaps also in an intermediate non-terminal block) which will be accessed by extending the prefix. While ordering by frequency of use or likelihood of occurrence is preferred, it should be understood that other criteria for ordering might also be employed.

Optionally, the invention contemplates a third type of block which may be utilized if the user or application program may need to access words which match a given spelling, as a whole word, rather than as a prefix. This feature, however, is not commonly needed and should be understood to be an optional feature which is, however, implemented in the particular embodiment being described by way of example.

As indicated previously, words are assigned to blocks by progressing through successive possible prefixes in character order and, for each prefix, determining the number of words in the set of words corresponding to that prefix. As used herein, character order means alphabetic order but including other characters such as punctuation marks. If the number of words is less than a predetermined maximum, all of the words in the set are assigned to a corresponding terminal block. The maximum number of words in a terminal block is a design parameter chosen at the time the dictionary is organized. If the number of words in the set is greater than the predetermined maximum, words up to a preselected number are assigned to the non-terminal block and the prefix is extended. The number of words assigned to a non-terminal block is again a design parameter selected at the time of organizing the dictionary file. The number of words which are assigned to a non-terminal block will be less than or equal to the maximum size of a terminal block and will typically be chosen to be somewhat larger than the largest list of words which is expected to be requested by the user or application program. For example, in a speech recognition system used for generating medical reports, a maximum block size of 500 words is appropriate and a non-terminal block size of 50 words represents an appropriate balance between the typical length of prefix required and expanding the size of the organized dictionary file. In addition to organizing the dictionary list into blocks, the method described herein also generates a list of prefixes corresponding to those blocks and, associated with each prefix, a pointer which identifies the corresponding block and allows it to be accessed from the disk file.

The computer program listing for dictionary creation included in the microfiche appendix implements a method of organizing the dictionary which is based on a recursive procedure. That recursive procedure is conveniently described with reference to the following pseudocode listing. As is understood by those skilled in the art, pseudocode provides an effective means of communicating computer program concepts without becoming embroiled in the details required by a particular programming language.

---

DICTIONARY CREATION METHOD

---

(0) START: get two parameters, MaxTermBlockSize = the maximum number of words in a terminal block and NontermBlockSize = the number of words in a non-terminal block (which must be <= the maximum number of words in a terminal block)
(1) Input a list of words and probabilities of occurrence
(2) Sort the list in ascending alphabetical order
(3) CALL PARTITION (6) with Sublist = whole list and Prefix = empty string
(4) Write prefix list and blocks to file
(5) END
(6) PARTITION: recursive procedure with two inputs, Sublist and Prefix
  (6a) If Sublist contains no words
    (6a1) RETURN
  (6b) Copy Sublist to ProbSortedSublist and sort latter in decreasing probability order
  (6c) If number of words in Sublist is <= MaxTermBlockSize
    (6c1) Copy ProbSortedSublist into a block and put a terminal entry in the prefix list that points to it
    (6c2) RETURN
  (6d) [Comment -- getting here means number of words in Sublist is > MaxTermBlockSize]
  (6e) Copy the first NontermBlockSize words in ProbSortedSublist into a block and put a nonterminal entry in the prefix list that points to it
  (6f) Find the initial range of words within Sublist that match Prefix as a whole word,
  (6g) If the number of words in range > MaxTermBlockSize
    (6g1) FAIL
  (6h) If the number of words in range > 0
    (6h1) Make a copy of the range and sort it in order of decreasing probability
    (6h2) Copy the sorted copy of the range into a block and put an exact-terminal entry in the prefix list pointing to it
    (6h3) Remove the initial range of words from Sublist
  (6i) While Sublist contains words
    (6i1) Set ExtendedPrefix to Prefix + the letter that appears immediately after it in the first word in Sublist
    (6i2) Find the initial range of words within Sublist that begin with ExtendedPrefix
    (6i3) CALL (6) with Sublist = the initial range of words and Prefix = ExtendedPrefix
    (6i4) Remove the initial range of words from Sublist
  (6j) RETURN

---

As indicated at step zero, the two design parameters described previously are selected and set in accordance with the needs of the user or application program and the overall size of the dictionary. The dictionary list of words is then input along with the probability or likelihoood of occurrence of each word, as indicated at step one. At step 2, the list is sorted in ascending alphabetical order if it were not already so sorted. At step 3, the method calls the recursive subroutine, step 6. As indicated at step 6, PARTITION is a recursive procedure with two inputs, these being designated "sublist" and "prefix". As is understood by those familiar with the programming art, the variables "sublist" and "prefix" will change at each instance of the recursive procedure. In the initial call at step 3, the sublist is set to be the same as the whole list of words input at step 1 and the prefix is set to be an empty or null string.

If the sublist contains no words, the subroutine returns as indicated at step 6a1. Otherwise, as indicated at step 6B, the sublist is copied to another list designated ProbSortedSublist and this list is sorted in decreasing probability order. If the number of words in the sublist is less than or equal to the maximum terminal block size, the sorted sublist is copied into a block and a terminal type entry is put into the prefix list that points to that block and the subroutine then returns. If the number of words in the sublist is greater than the maximum terminal block size, a non-terminal block is created and the appropriate number of words from the top of the sorted sublist is put into that block and a non-terminal type entry is placed in the prefix list to point to the new block.

As indicated previously, the particular implementation being described provides for implementing matches of complete words. This optional feature is implemented at steps 6F–6H4. The method step 6F finds the initial range of words within the sublist that match the prefix spelling as a whole word. If the number of words in the range exceeds the terminal block size value, the organization program returns a fail indicator as indicated at 6G1. This is an extremely unlikely event which would occur only if a very large number of words collapsed into the same spelling due to orthography merging as described previously, e.g. if there were a very large number of words which comprised only punctuation marks. Even this would likely not occur unless the terminal block size were set to an inappropriately low value.

If there are some whole word match words (but less than the non-terminal block size value), a copy of those words is made as indicated at step 6h2 and the copy is sorted in order of decreasing probability. The sorted copy is then copied into a block and an exact terminal type entry is put into the prefix list to point to that block. That range of words is then removed from the sublist as indicated at step 6h4.

While the sublist still contains words, the prefix is extended by adding to it the letter that appears immediately after it in the first word in the sublist. Choosing the letter for extension in this fashion avoids the need for testing extensions for which there are no word matches which would occur if straightforward alphabetical sequence testing were employed. At step 6i2, the initial range of words within the sublist is found that begin with the extended prefix. At this point, the recursive subroutine calls itself with "sublist" equal to the initial range of words found in step 6i2 and with the prefix equal to the extended prefix. Upon return from the nested call, the initial range of words is removed from the sublist as indicated at step 6i4 and the subroutine returns as indicated at step 6j.

Figure 2:
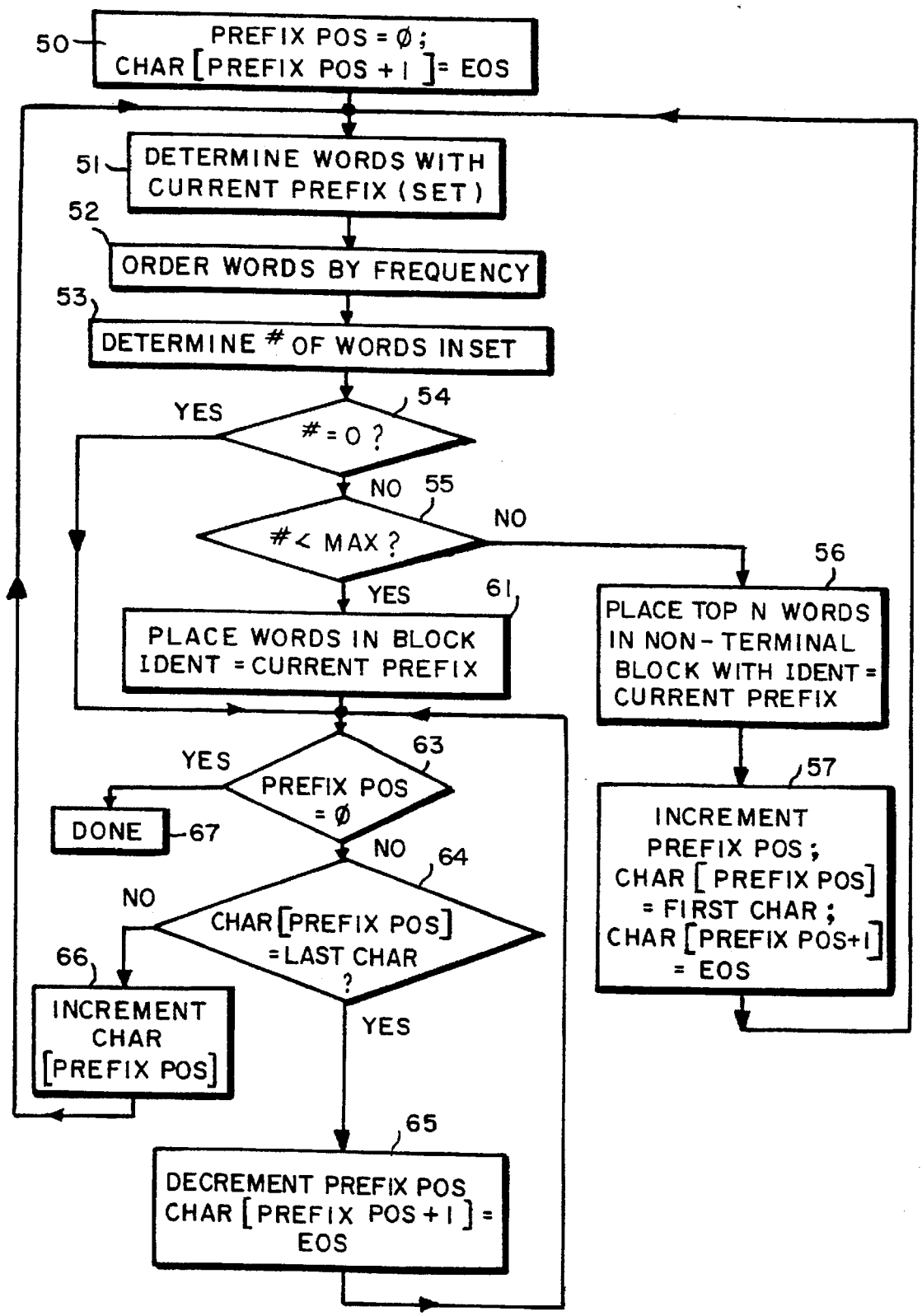
FIG. 2 is a flow chart illustrating the method of organizing the electronic dictionary.

While the preferred embodiment of the present invention employs the recursive method described above and implemented in detail in the computer program listing contained in the microfiche appendix, it should be understood that this method could also be implemented by an iterative procedure rather than a recursive one. Such an iterative procedure is illustrated in the flow chart of FIG. 2.

In the initial block, designated by reference character 50, the prefix position is initially set to zero. An end-of-string marker is placed at the next character position to facilitate string comparisons as is understood by those skilled in the art. The words with the current prefix are then determined in step 51. Upon first entering the procedure, this will comprise all the words in the dictionary. The words in the set are then ordered by frequency or likelihood as indicated at step 52.

The number of words in the set is determined at step 53 and, if this number is non-zero, as determined at step 54, and greater than the maximum terminal block size, as determined at step 55, the top N words are placed in a nonterminal block with the identifier or pointer equal to the current prefix, as indicated at step 56. The value N is in this case again the design parameter designating the nonterminal block size. As indicated at block 57, the prefix position is then advanced or incremented and the character value is set to its initial value, to start a straightforward alphabetic scan. The program then returns from this branch to block 51 as indicated.

If the test at block 55 determines that the number of words in the current set is not greater than the maximum terminal block size, all of the words in the set are placed in a terminal block with its identifier or pointer equal to the current prefix as indicated at block 61.

If the prefix position has not returned to zero as tested at block 63, block 64 tests to see if the character sequence has reached its end point for the current prefix position, e.g. the end of the alphabetic sequence. If the end of the character sequence has been reached for the current prefix position, the prefix position is decremented as indicated at block 65 and the program returns to block 63 as indicated. If not, the character value is incremented as indicated at block 66 and the program returns to block 51 as indicated.

Once the prefix position has returned to zero, as tested at block 63, the organization program is completed. As will be understood, the iterative procedure of FIG. 2 ignores exact matches and thus does not involve the optional feature provided in the recursive methods described previously.

With the dictionary organized in the manner described, a lookup function to obtain a list of words corresponding to a given prefix is relatively straightforwardly implemented. The dictionary lookup method implemented in the computer listing in the microfiche appendix can conveniently be described with reference to the following pseudo-code listing.

(7) LOOKUP: a procedure with two inputs, ExactFlag, which can be
either True, indicating exact match, or- False, indicating
prefix match, Target, the target prefix or string, and
RequestedListSize, the maximum number of matching words to
be returned
   (7a)     If ReqestedListSize > Nonterminal BlockSize
         (another parameter determined at file creation time)
         (7a1) FAIL
   (7b)     Look for the entry or entries in the prefix table
         entry corresponding to Target -- a corresponding
         entry is one whose prefix is a prefix of the
         target and there is no other entrys whose prefix
         is longer and is also a prefix of the target.
   (7c)     [Comment -- the preceding lookup up can produce
         four different results: [1] no entries, [2] a
         terminal entry, [3] a nonterminal entry, and [4] a
         nonterminal entry and an exact-terminal entry]

-continued (7d)     If no entries are found OR if ExactFlag is True
         and only a nonterminal entry was found
         (7d1)    RETURN the empty list
   (7e)     If two entries were found, a nonterminal and an
         exact-terminal,
         (7e1)    Select the exact-terminal entry if ExactFlag
              is True, the nonterminal entry if ExactFlag
              is False
   (7f)     [Comment -- at this point a single prefix entry
         has been found or chosen -- an exact-terminal or
         terminal entry if ExactFlag = True and a
         nonterminal or terminal entry if ExactFlag =
         False]
   (7g)     If there is currently a block read into memory and
         it is the block that the prefix entry for Target
         points to,
         (7g1)    Leave it as it is the current block
   (7h)     Else
         (7h1)    Read the required block into memory from the
              file using the location info in the prefix
              entry
   (7i)     [Comment -- at this point the block pointed to by
         the entry for Target is in memory]
   (7j)     Set MatchFunction as follows: Exactmatch if
         ExactMatch is True, PrefixMatch if Exactmatch is
         False
   (7k)     Scan the list of words in the current block from
         the top down looking for words which satisfy
         MatchFunction for Target [i.e. exactly matches
         Target for ExactMatch, begins with Target for
         PrefixMatch]; stop after finding RequestedListSize
         words or reaching the end of the list of words in
         the block
   (7l)     RETURN the list of found matching words.

As indicated at step 7, the lookup procedure responds to three inputs provided by the user or application program. These inputs indicate whether an exact match search is to be performed or not; provide the target prefix; and provide a value indicating the size of the list of words to be returned.

At step 7a, the procedure tests to make sure that the requested list size is not greater than the nonterminal block size, the design parameter determined during dictionary creation. At step 7b, the prefix list is scanned for entries corresponding to the target prefix. A corresponding entry is one whose prefix is a prefix of the target and there is no other entrys whose prefix is longer and is also a prefix of the target. As noted in the pseudo-code comment, the scanning can produce four possible results:

(1) that there were no entries;
(2) that there was a terminal entry only;
(3) that there was a nonterminal entry only; and
(4) that there was both a nonterminal entry and an exact terminal entry.

If no entries are found or if the search were for an exact match and only a nonterminal entry was found, an empty list is returned as indicated at step 71. If both nonterminal and exact-terminal entries are found, the exact-terminal entry is selected if the exact flag is true and the nonterminal entry is selected if the exact flag is false. At this point, a single prefix entry has been found or selected.

If the block corresponding to the single entry has already been read into memory, it is left there. Otherwise, the desired block is read into memory from the disk file. As indicated at step 7k, the words in the current block are then scanned from the top down for words which satisfy the match function, i.e. for words which exactly match the target sequence if the search is for an exact match and for words which begin with the target prefix or if only a prefix match is needed. Scanning is stopped after finding the number of words equal to the requested list size or upon reaching the end of the list of words in the block. The list of matching words is then returned as indicated at step 71. It should also be understood that since each block is ordered by a frequency of occurrence value, simply scanning the block from the top down will produce an already ordered list of words which match each current prefix and that no subsequent ordering by frequency of occurrence will be required. Further, as will be understood by those skilled in the art, this procedure will repeatedly scan a terminal block if the prefix is repeatedly extended.

Figure 3:
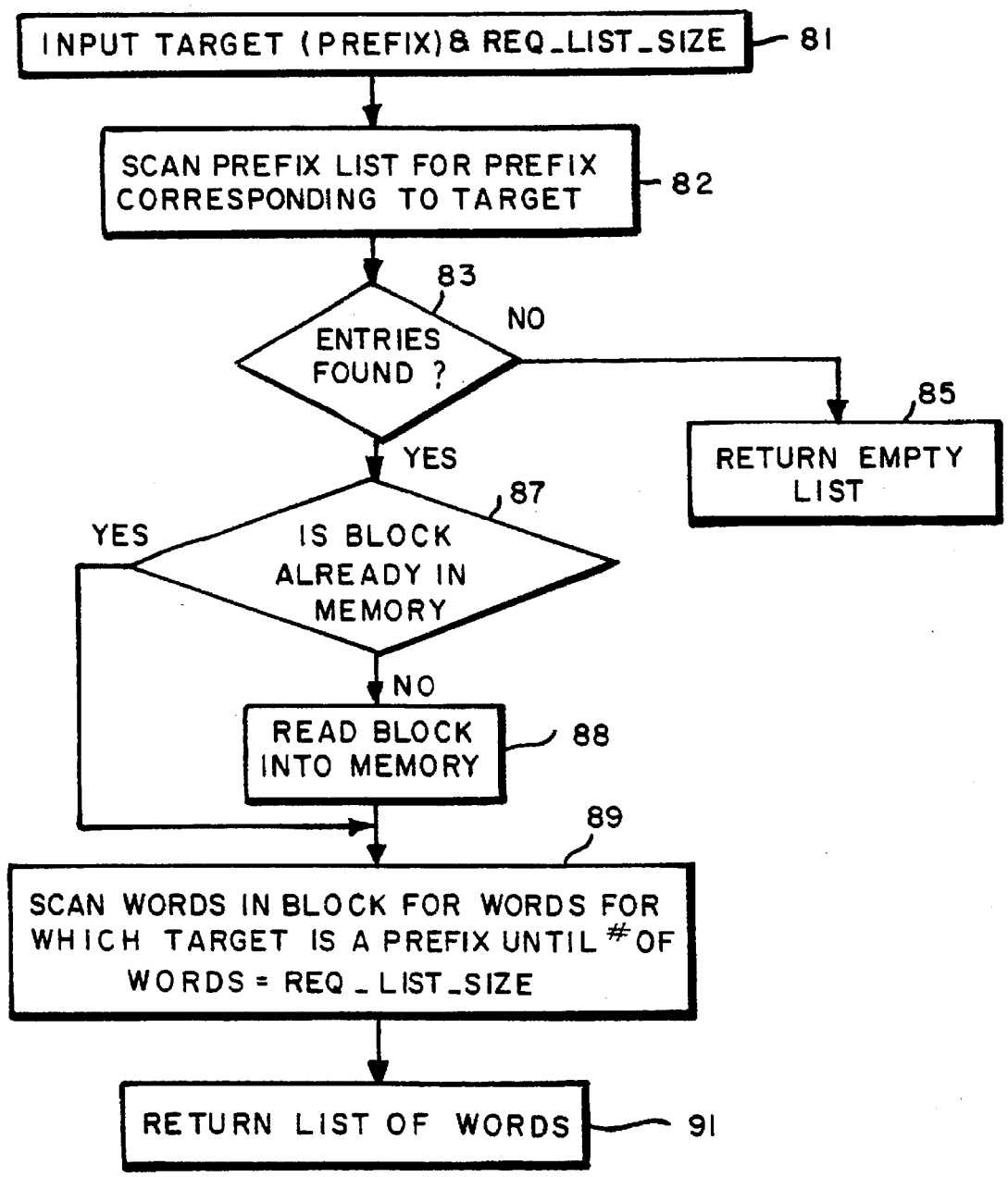
FIG. 3 is a flow chart illustrating the search of the dictionary.

An essentially equivalent method is illustrated in the flow chart of FIG. 3. Again, the method illustrated in the flow chart omits the optional feature of exact match searcing which is incorporated in the pseudocode description.

As indicated at step 81, the method takes in from the user or application program a target value for the prefix and also a value (ReqListSize) for the requested list size. The prefix list is then scanned, as indicated at step 82, for an entry corresponding to the target value. If no such entry is found, it is tested at step 83 and an empty list is returned. If a matching entry is found, the method then determines if the corresponding block is already in memory, as indicated in step 87. If it is not, it is read into memory, as indicated at step 88. The words in the block are then scanned, as indicated at step 89, for words for which the target value is a prefix. This scanning continues until the number of words equals the requested list size and that list of words is then returned, as indicated at step 91.

As indicated previously, a block may be repeatedly scanned as a prefix is extended. As is understood, successive scans will typically extend more deeply into the list of words in the block since the match criteria becomes more exact. It should also be understood that since each block is ordered by a frequency of occurrence value, simply scanning the block from the top down will produce an already ordered list of words.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A method of organizing an electronic dictionary for expeditious search based on partial spelling by assigning words in the dictionary to blocks having a predetermined maximum size, said blocks being represented by respective partial spelling sequences, the assignment to blocks being in accordance with the method which comprises:
progressing through successive possible sequences in character order and, for each such sequence;
determining the number of words in the set of words incorporating the current sequence as initial characters;
if the number of words in the set incorporating the current sequence is less than said maximum size, assigning all of the words in the set to a corresponding terminal block;
otherwise, assigning words in the set up to a preselected number to a corresponding non-terminal block and extending the current sequence,
whereby a user of the dictionary is provided with a listing of candidate words on the basis of a partial spelling which correspondingly identifies a block of words.

2. A method of organizing an electronic dictionary for expeditious search based on partial spelling where a likelihood of occurrence value is associated with each word in the dictionary by assigning words in the dictionary to terminal blocks having a predetermined maximum size and non-terminal blocks comprising a preselected number of words, said blocks being represented by respective partial spelling sequences, the assignment to blocks being in accordance with the method which comprises:
progressing through successive possible sequences in character order and, for each such sequences;
determining the number of words in the set of words incorporating the current sequence as initial characters;
if the number of words in the set incorporating the current sequence is less than said maximum size, assigning all of the words in the set to a corresponding terminal block;
otherwise, assigning the words having the highest likelihood values in the set, up to said preselected number, to a corresponding non-terminal block and extending the current sequence
whereby a user of the dictionary is provided with a listing of candidate words on the basis of a partial spelling which correspondingly identifies a block of words.

3. A method as set forth in claim 2 wherein the words in each terminal block are ordered in accordance with the respective likelihood of occurrence values.

4. A method of organizing an electronic dictionary for expeditious search based on partial spelling where a likelihood of occurrence value is associated with each word in the dictionary by assigning words in the dictionary to terminal blocks having a predetermined maximum size and non-terminal blocks comprising a preselected number of words, and generating a list of partial spelling sequences which represent respective blocks and are associated with pointers which specify the location of the respective blocks, the assignments being in accordance with the method which comprises:
progressing through successive possible sequences in character order and, for each sequence for which there are words in the dictionary;
determining the number of words in the set of words corresponding to that sequence;
if the number of words in the current set is less than said maximum size, assigning all of the words in the set to a corresponding terminal block and putting a corresponding entry into said list;
otherwise, assigning the most likely to occur words in the set up to said preselected number to a corresponding non-terminal block, putting a corresponding entry into said list, and extending the partial spelling sequence
whereby a user of the dictionary can be provided with a listing of candidate words on the basis of a partial spelling which, based on said list, correspondingly identifies a block of words.

5. A method of locating, on the basis of a partial spelling, a desired word in an electronic data-stored dictionary, said method comprising:
providing a collection of stored data blocks containing words from said dictionary, said data blocks being of at least two types:
(A) terminal blocks having a predetermined maximum size and
(B) non-terminal blocks which comprise a preselected number of words, said blocks being represented by respective unique partial spelling sequences, said terminal blocks comprising all words from the dictionary having the respective partial spelling sequence, said non-terminal blocks comprising said preselected number of words having the respective partial spelling sequence;

providing also an index listing the partial spelling sequences in association with location information for locating the respective stored data block;

using an input partial spelling to access said index thereby to locate a corresponding data block whose partial spelling sequence is the longest which is an initial portion of the input partial spelling.

6. A method of locating, on the basis of a partial spelling, a desired word in an electronic data-stored dictionary, where a likelihood of occurrence value is associated with each word in the dictionary, said method comprising:

providing a collection of stored data blocks containing words from said dictionary, said data blocks being of at least two types:

(A) terminal blocks having a predetermined maximum size and (B) non-terminal blocks which comprise a preselected number of words, said blocks being represented by respective partial spelling sequences, said terminal blocks comprising all words from the dictionary having the respective partial spelling sequence, said non-terminal blocks comprising said preselected number of the most likely to occur of the words having the respective partial spelling sequence;

providing also an index listing the partial spelling sequences in association with information for locating the respective stored data block;

using an input partial spelling to locate a corresponding data block whose partial spelling sequence is the longest which is an initial portion of the input partial spelling.

7. A method as set forth in claim 6 wherein the words in said blocks are ordered in accordance with the respective likelihood of occurrence values.

8. A method as set forth in claim 7 further comprising scanning the located block to identify words for which said input partial spelling is a partial spelling sequence.

* * * * *